United States Patent
Hill

(10) Patent No.: US 6,552,805 B2
(45) Date of Patent: Apr. 22, 2003

(54) CONTROL OF POSITION AND ORIENTATION OF SUB-WAVELENGTH APERTURE ARRAY IN NEAR-FIELD MICROSCOPY

(75) Inventor: Henry A. Hill, Tucson, AZ (US)

(73) Assignee: Zetetic Institute, Tucson, AZ (US)

(*) Notice: Subject to any disclaimer, the term of this patent is extended or adjusted under 35 U.S.C. 154(b) by 0 days.

(21) Appl. No.: 09/917,401

(22) Filed: Jul. 27, 2001

(65) Prior Publication Data

US 2002/0033952 A1 Mar. 21, 2002

Related U.S. Application Data

(60) Provisional application No. 60/221,287, filed on Jul. 27, 2000.

(51) Int. Cl.[7] .................................................. G01B 9/02
(52) U.S. Cl. ........................ 356/511; 356/496; 356/512
(58) Field of Search ............................... 356/511, 512, 356/496

(56) References Cited

U.S. PATENT DOCUMENTS

| | | | |
|---|---|---|---|
| 4,659,429 A | * | 4/1987 | Isaacson et al. ............... 216/24 |
| 4,681,451 A | | 7/1987 | Guerra et al. |
| 5,004,307 A | | 4/1991 | Kino et al. |

(List continued on next page.)

FOREIGN PATENT DOCUMENTS

| | | |
|---|---|---|
| DE | 198 58 490 A1 | 6/2000 |
| EP | 0 409 468 A2 | 1/1991 |
| EP | 0 757 271 A2 | 2/1997 |
| JP | 5073980 | 3/1993 |
| JP | 5174410 | 7/1993 |

OTHER PUBLICATIONS

Bauer et al., "Magnetic Domain Imaging with a Scanning Near–Field Optical Microscope Using a Modified Sagnac Interferometer," *Journal of Microscopy*, 194:2/3:507–511, May/Jun. 1999.

Courjon et al., "New Optical Near Field Developments: Some Perspectives in Interferometry," *Ultramicroscopy*, 61:117–125, 1995.

Pilevar et al., "Reflection Near–Field Scanning Optical Microscopy: an Interferometric Approach," *Ultramicroscopy*, 61:233–236, 1995.

Pohl et al., "Near–field Optics: Light for the World of NANO," *J. Vac. Sci. Technol. B*, 12:3:1441–1446, May/Jun. 1994.

Vaez–Iravani et al., "Phase Contrast and Amplitude Pseudoheterodyne Interference Near Field Scanning Optical Microscopy," *Appl. Phys. Lett.* 62:10:1044–1046, Mar. 8, 1993.

Fischer, "Optical Characteristics of 0.1 βm Circular Apertures in a Metal Film as Light Sources for Scanning Ultramicroscopy," *J. Vac. Sci Technol. B* 3:1:386–390, Jan./Feb. 1985.

(List continued on next page.)

*Primary Examiner*—Constantine Hannaher
*Assistant Examiner*—Shun Lee
(74) *Attorney, Agent, or Firm*—Fish & Richardson P.C.

(57) ABSTRACT

Systems and methods for near-field, interferometric microscopy are disclosed in which a mask having an array of sub-wavelength apertures is used to couple near-field probe beams to a sample. The periphery of the mask further includes one or more larger apertures to couple light to the sample that forms the basis of an interferometric signal indicative of the relative distance between the mask and the sample. The interferometric signal can be the basis of a control signal in a servo system that dynamically positions the mask relative to the sample.

32 Claims, 6 Drawing Sheets

U.S. PATENT DOCUMENTS

| | | |
|---|---|---|
| 5,105,403 A | 4/1992 | Kando et al. |
| 5,105,408 A | 4/1992 | Lee et al. |
| 5,121,256 A | 6/1992 | Corle et al. |
| 5,125,750 A | 6/1992 | Corle et al. |
| 5,150,338 A | 9/1992 | Birecki et al. |
| 5,214,630 A | 5/1993 | Goto et al. |
| 5,327,223 A * | 7/1994 | Korth .......................... 356/511 |
| 5,349,443 A | 9/1994 | Guerra |
| 5,371,588 A | 12/1994 | Davis et al. |
| 5,442,443 A | 8/1995 | Guerra |
| 5,497,359 A | 3/1996 | Mamin et al. |
| 5,602,643 A | 2/1997 | Barrett |
| 5,602,819 A | 2/1997 | Inagaki et al. |
| 5,602,820 A | 2/1997 | Wickramasinghe et al. |
| 5,666,197 A | 9/1997 | Guerra |
| 5,689,480 A | 11/1997 | Kino |
| 5,739,527 A | 4/1998 | Hecht et al. |
| 5,760,901 A | 6/1998 | Hill |
| 5,789,734 A | 8/1998 | Torigoe et al. |
| 5,834,767 A | 11/1998 | Hasegawa et al. |
| 5,883,872 A | 3/1999 | Kino |

OTHER PUBLICATIONS

Fischer et al., "Near–Field Optical ScanningMicroscopy and Enhanced Spectroscopy with Submicron Apertures," *Scanning Microscopy Supplement*, 1:47–52, 1987.

Durig et al., "Near–Field Optical–Scanning Microscopy," *J. Appl. Phys.* 59:10:3318–3327, May 15, 1986.

Meixner et al., "Direct Measurement of Standing Evanescent Waves with a Photon–Scanning Tunneling Microscope," *Applied Optics*, 33:34:7995–8000, Dec. 1, 1994.

Bainier et al., "Evanescent Interferometry by Scanning Optical Tunneling Detection," *J. Opt.Soc.Am.A*, 13:2:267–275, Feb. 1996.

Guerra, "Photon Tunneling Microscopy," *Applied Optics*, 29:26:3741–3752, Sep. 10, 1990.

* cited by examiner

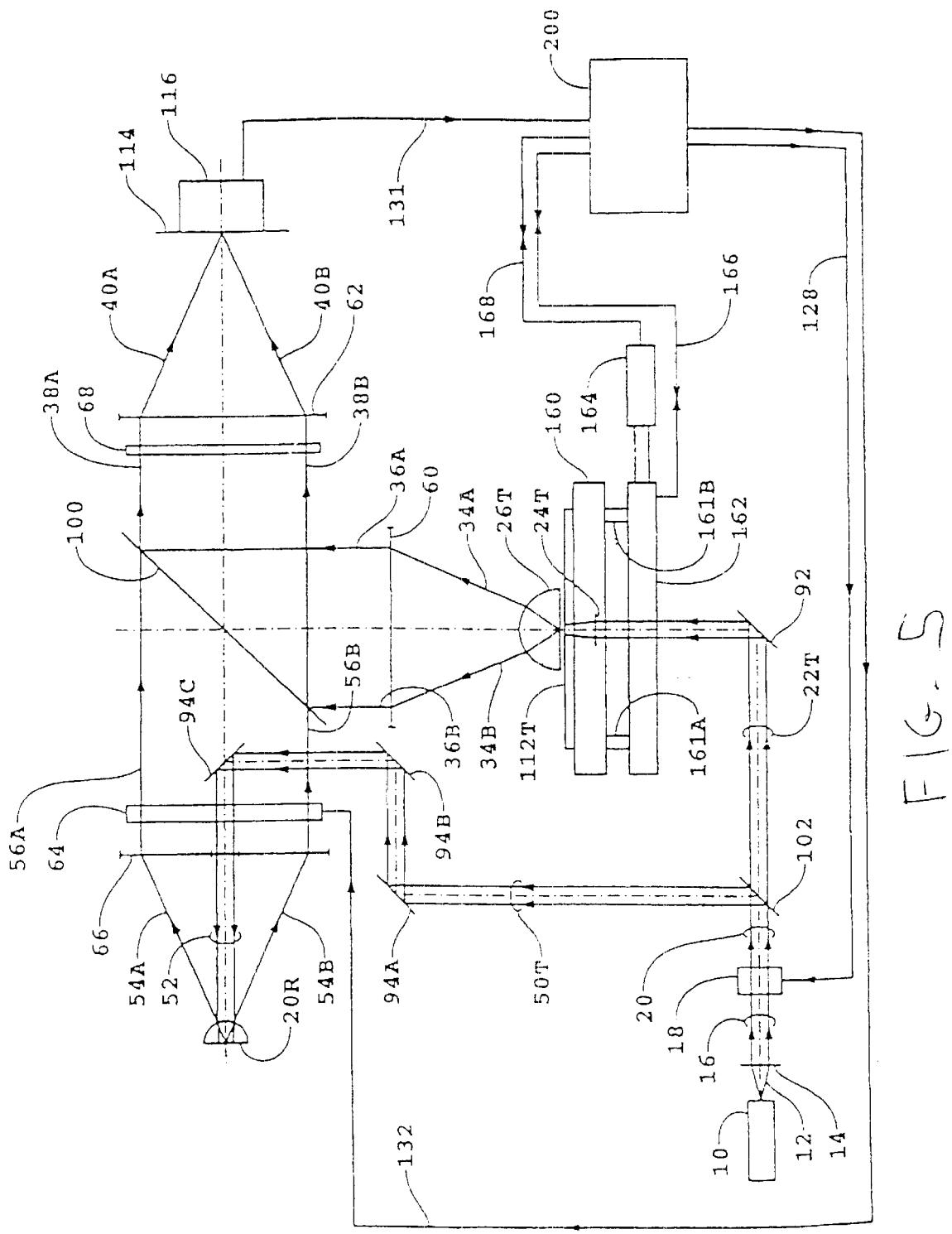

CONTROL OF POSITION AND ORIENTATION OF SUB-WAVELENGTH APERTURE ARRAY IN NEAR-FIELD MICROSCOPY

CROSS-REFERENCE TO RELATED APPLICATIONS

This application claims priority from provisional application Serial No. 60/221,287 by Henry A. Hill filed Jul. 27, 2000 entitled "Control of Position and Orientation of Sub-Wavelength Aperture Array in Near-field Scanning Microscopy," the contents of which is incorporated herein by reference.

BACKGROUND

This invention is related to optical imaging and metrology of semiconductor, data-storage, and biological materials, structures, and devices.

The near-field scanning probe is typically a sub-wavelength aperture positioned in close proximity to a sample; in this way, sub-wavelength spatial resolution in the object-plane is obtained. An aperture smaller than a free space optical wavelength of an optical beam used in a near-field microscopy application is hereinafter referred to as a sub-wavelength aperture.

Positioning the near-field scanning probe in close proximity, preferably in a non-contact mode, is known in the field as "the approach problem."

SUMMARY OF INVENTION

The invention features systems and methods for near-field, interferometric microscopy in which a mask having an array of sub-wavelength apertures is used to couple near-field probe beams to a sample. The periphery of the mask further includes one or more larger apertures to couple light to the sample that forms the basis of an interferometric signal indicative of the relative distance between the mask and the sample. The interferometric signal can be the basis of a control signal in a servo system that dynamically positions the mask relative to the sample. In some embodiments, light coupled to the sample though the large aperture is scattered by the sample and detected through one of the sub-wavelength aperture and mized with a reference beam component to produce interferometric control signal. In general, the systems may operate in either reflective or transmissive modes, and may be used to investigate the profile of a sample, to read optical date from a sample, and/or write optical date to a sample.

In general, in one aspect, the invention features an interferometric optical microscopy system for imaging an object. The system includes: a beam splitter positioned to separate an input beam into a measurement beam and a reference beam; a measurement beam source array positioned to receive the measurement beam; a reference beam source array positioned to receive the reference beam; a multi-element photo-detector; and imaging optics.

The measurement beam source array includes a mask having an array of measurement apertures and a control aperture adjacent one of the measurement apertures, wherein the control aperture has transverse dimensions larger than the transverse dimensions of the adjacent measurement aperture. Each of the measurement apertures and the control aperture is configured to radiate a portion of the measurement beam to the object. The object interacts with the radiated measurement beam portions and in response directs signal radiation back through the measurement apertures to define a measurement return beam. The transverse dimensions of the control aperture are selected to cause the signal radiation directed back through the measurement aperture adjacent the control aperture to be dominated by radiation derived from the control aperture. The reference beam source array includes an array of elements each configured to radiate a portion of the reference beam, the radiated reference beam portions defining a reference return beam.

The imaging optics are positioned to direct the measurement and reference return beams to the photo-detector and configured to produce overlapping conjugate images of the array of reference elements and the array of measurement apertures on the photo-detector. The conjugate image for each measurement aperture overlaps with the conjugate image of a corresponding reference element to produce an optical interference signal indicative of a particular region of the object.

Embodiments of the microscopy system may further include any of the following features.

The system may further include a positioning system for supporting the object relative to the measurement beam source array, and an electronic controller coupled to the photo-detector and the positioning system. During operation the electronic controller causes the positioning system to adjust the separation between the measurement beam source array and the object in response to a control signal derived from the interference signal corresponding to the measurement aperture adjacent the control aperture.

The mask may include multiple control apertures each adjacent one of the measurement apertures, wherein each control aperture has transverse dimensions larger than the transverse dimensions of the corresponding adjacent measurement aperture. For example, the multiple control apertures may surround the periphery of the array of the measurement apertures.

The system may further include a source for providing the input beam. Furthermore, each of the measurement apertures may have a transverse dimension less than a vacuum wavelength of the input beam provided by the source. Moreover, the control aperture may have a transverse dimension greater than or equal to the vacuum wavelength of the input beam provided by the source.

The control aperture may be located at the periphery of the array of measurement apertures. Furthermore, an end of each measurement aperture adjacent the object, other than the measurement aperture adjacent the control aperture, may lie in a first common plane, and an end of each of the control aperture and the measurement aperture adjacent the control aperture may be displaced relative to the first common plane. For example, such ends of the control aperture and the measurement aperture adjacent the control aperture may lie in a second common plane parallel to the first common plane. The system may further include a source providing the input beam, wherein the first common plane is displaced from the second common plane by an amount equal to about twice the wavelength of the input beam.

The system may further include a pinhole array positioned adjacent the photo-detector, wherein each pinhole is aligned with a separate set of one or more detector elements, and wherein the imaging system causes the conjugate image for each measurement aperture to align with a corresponding pinhole of the pinhole array.

The mask in the measurement beam source array may further include an array of measurement scattering elements, wherein each measurement scattering element is adjacent a corresponding one of the measurement apertures and has transverse dimensions comparable to the corresponding measurement aperture. Each measurement scattering element scatters a portion of the measurement beam. In such cases, the measurement return beam further includes the portions of the measurement beam scattered by the measurement scattering elements. The imaging optics are further configured to produce a conjugate image of the array of measurement scattering elements that overlaps with the conjugate image of the array of reference elements, wherein the conjugate image for each measurement scattering element overlaps with the conjugate image of a corresponding reference element to produce an optical interference signal indicative of scattering from the adjacent measurement aperture.

Furthermore, in embodiments involving the scattering elements, the control aperture may located at the periphery of the array of measurement apertures, and an end adjacent the object of each measurement aperture and each measurement scattering element other than the measurement aperture adjacent the control aperture and the measurement scattering element adjacent the measurement aperture adjacent the control aperture may lie in a first common plane, and wherein an end adjacent the object of each of the control aperture, the measurement aperture adjacent the control aperture, and the measurement scattering site adjacent the measurement aperture adjacent the control aperture may be displaced relative to the first common plane. Furthermore, the ends of the control aperture and the measurement aperture adjacent the control aperture may lie in a second common plane parallel to the first common plane. Also, the system may further include a source providing the input beam, and the first common plane may be displaced from the second common plane by an amount equal to about twice the wavelength.

Furthermore, in embodiments involving the scattering elements, the system may further include a positioning system for supporting the object relative to the measurement beam source array, and an electronic controller coupled to the photo-detector and the positioning system. During operation the electronic controller causes the positioning system to adjust the separation between the measurement beam source array and the object in response to a control signal derived from the interference signal corresponding to the measurement aperture adjacent the control aperture and the interference signal corresponding to the measurement scattering site adjacent the measurement aperture adjacent the control aperture.

Furthermore, in embodiments involving the scattering elements, the system may further including a pinhole array positioned adjacent the photo-detector. Each pinhole is aligned with a separate set of one or more detector elements, and the imaging system causes the conjugate image for each measurement aperture and each measurement scattering element to align with a corresponding pinhole of the pinhole array.

Each reference element may include a reflective element.

Each reference element includes a transmissive aperture.

In general, in another aspect, the invention features, a source array for illuminating an object. The source array includes: a mask positioned to receive a measurement beam, the mask having an array of source apertures and a control aperture adjacent one of the source apertures. The control aperture has transverse dimensions larger than the transverse dimensions of the adjacent source aperture. Each of the source apertures and the control aperture is configured to radiate a portion of the measurement beam to the object. The object interacts with the radiated measurement beam portion from the control aperture to direct control signal radiation back through the source aperture adjacent the control aperture.

Embodiments of the source array may further include any of the following features.

The mask may include multiple control apertures each adjacent one of the measurement apertures, wherein each control aperture has transverse dimensions larger than the transverse dimensions of the corresponding adjacent measurement aperture. For example, the multiple control apertures may surround the periphery of the array of the measurement apertures.

The system may further include a source for providing the measurement beam. Furthermore, each of the measurement apertures may have a transverse dimension less than a vacuum wavelength of the measurement beam provided by the source. Moreover, the control aperture may have a transverse dimension greater than or equal to the vacuum wavelength of the measurement beam provided by the source.

The control aperture may be located at the periphery of the array of measurement apertures. Furthermore, an end of each measurement aperture adjacent the object, other than the measurement aperture adjacent the control aperture, may lie in a first common plane, and an end of each of the control aperture and the measurement aperture adjacent the control aperture may be displaced relative to the first common plane. For example, such ends of the control aperture and the measurement aperture adjacent the control aperture may lie in a second common plane parallel to the first common plane. The system may further include a source providing the input beam, wherein the first common plane is displaced from the second common plane by an amount equal to about twice the wavelength of the measurement beam.

The mask in the measurement beam source array may further include an array of measurement scattering elements, wherein each measurement scattering element is adjacent a corresponding one of the measurement apertures and has transverse dimensions comparable to the corresponding measurement aperture.

In another aspect, the invention features a system for illuminating an object, the system including: the source array described above; a positioning system for supporting the object relative to the source array; and an electronic controller coupled to the positioning system, wherein during operation the electronic controller causes the positioning system to adjust the separation between the measurement beam source array and the object in response to a control signal based on an interference signal derived from the control signal radiation.

In general, in another aspect, the invention features a method for illuminating an object with multiple sources, the method including: positioning a mask adjacent the object, wherein the mask has an array of source apertures and a control aperture having transverse dimensions greater than the transverse dimensions of each of the source apertures; directing radiation to the mask to cause each of the source apertures and the control aperture to radiate a portion of the radiation to the object; producing an optical interference signal derived from radiation directed to the object from the control aperture; and repositioning the mask relative to the object in response to a control signal derived from the optical interference signal. The method may further include features corresponding to any of the features described above for the microscopy system and the source array.

Confocal and near-field confocal, microscopy systems are also described in the following, commonly-owed provisional applications: Ser. No. 09/631,230 filed Aug. 2, 2000 by Henry A. Hill entitled "Scanning Interferometric Near-Field Confocal Microscopy," and the corresponding PCT Publication WO 01/09662 A2 published Feb. 8, 2001; Provisional Application Serial No. 60/221,019 filed Jul. 27, 2000 by Henry A. Hill and Kyle B. Ferrio entitled "Multiple-Source Arrays For Confocal And Near-Field Microscopy" and the corresponding Utility application Ser. No. 09/917,402 having the same title filed on Jul. 27, 2001; Provisional Application Serial No. 60,221,086 filed Jul. 27, 2000 by Henry A. Hill entitled "Scanning Interferometric Near-Field Confocal Microscopy with Background Amplitude Reduction and Compensation" and the corresponding Utility application Ser. No. 09/917,399 having the same title filed on Jul. 27, 2001; Provisional Application Serial No. 60/221,091 filed Jul. 27, 2000 by Henry A. Hill entitled "Multiple-Source Arrays with Optical Transmission Enhanced by Resonant Cavities and the corresponding Utility application Ser. No. 09/917,400 having the same title filed on Jul. 27, 2001; and Provisional Application Serial No. 60/221,295 by Henry A. Hill filed Jul. 27, 2000 entitled "Differential Interferometric Confocal Near-Field Microscopy" and the corresponding Utility application Ser. No. 09/917,276 having the same title filed on Jul. 27, 2001; the contents of each of the preceding applications being incorporated herein by reference. Aspects and features disclosed in the preceding provisional applications may be incorporated into the embodiments described in the present application.

Embodiments of the invention may include any of the following advantages.

One advantage is the control of position and orientation of an array of wavelength and sub-wavelength apertures in a non-contact approach to a sample being imaged.

Another advantage is the control of position and orientation of an array of wavelength and sub-wavelength apertures in a non-contacting close proximity to a sample being imaged.

Another advantage is the control of position and orientation of an array of wavelength and sub-wavelength apertures in a non-contacting close proximity scan across a sample being imaged.

Another advantage is the control of position and orientation of an array of wavelength and sub-wavelength apertures in a non-contacting close proximity scan across a sample being imaged wherein the sample surface has departures from a flat surface.

Another advantage is the mapping of a surface profile in real time during a scan of the surface for control of position and orientation of an array of wavelength and sub-wavelength apertures in non-contacting close proximity to the surface.

Another advantage is that information for control of position and orientation of an array of wavelength and sub-wavelength apertures in a non-contacting close proximity scan across a sample being imaged is obtained with a subset of the array of wavelength and sub-wavelength apertures.

Other aspects, features, and advantages follow.

BRIEF DESCRIPTION OF THE DRAWINGS

In the drawings, wherein like reference characters denote similar elements throughout the several views:

FIG. 5 illustrates, in schematic form, an embodiment of the invention operating in a transmission mode.

DETAILED DESCRIPTION OF THE INVENTION

Embodiments comprise scanning interferometric near-field confocal microscopes. For the near-field applications one or more of the apertures may have a dimension or dimensions less than wavelength of the free-space incident beam, e.g., a sub-wavelength aperture. In other applications, one or more of the apertures may have a dimension or dimensions less than, comparable to, or greater than the wavelength of the free-space incident beam, e.g., wavelength apertures.

While the apparatus of the present invention has application for a wide range of radiation sources, the following description is taken, by way of example, with respect to an optical measuring system in which the incident beam is a beam of electromagnetic radiation, e.g., an optical beam. In further embodiments, for example, the beam incident on the aperture or arrays of apertures can include an acoustic radiation beam, an electron beam, and an atomic beam.

The source of optical beams used by embodiments of the present invention include CW and pulsed sources in different combinations with single and multiple wavelength sources.

Also, while the apparatus of the present invention has application for a wide range of imaging systems, the following description is taken, by way of example, with respect to interferometric confocal near-field microscopy measuring systems. The measuring systems as used herein include, but are not limited to, use in scanning and step-and-repeat interferometric near-field confocal microscopy systems and scanning and step-and-repeat confocal and interferometric confocal microscopy systems.

Figure 1:
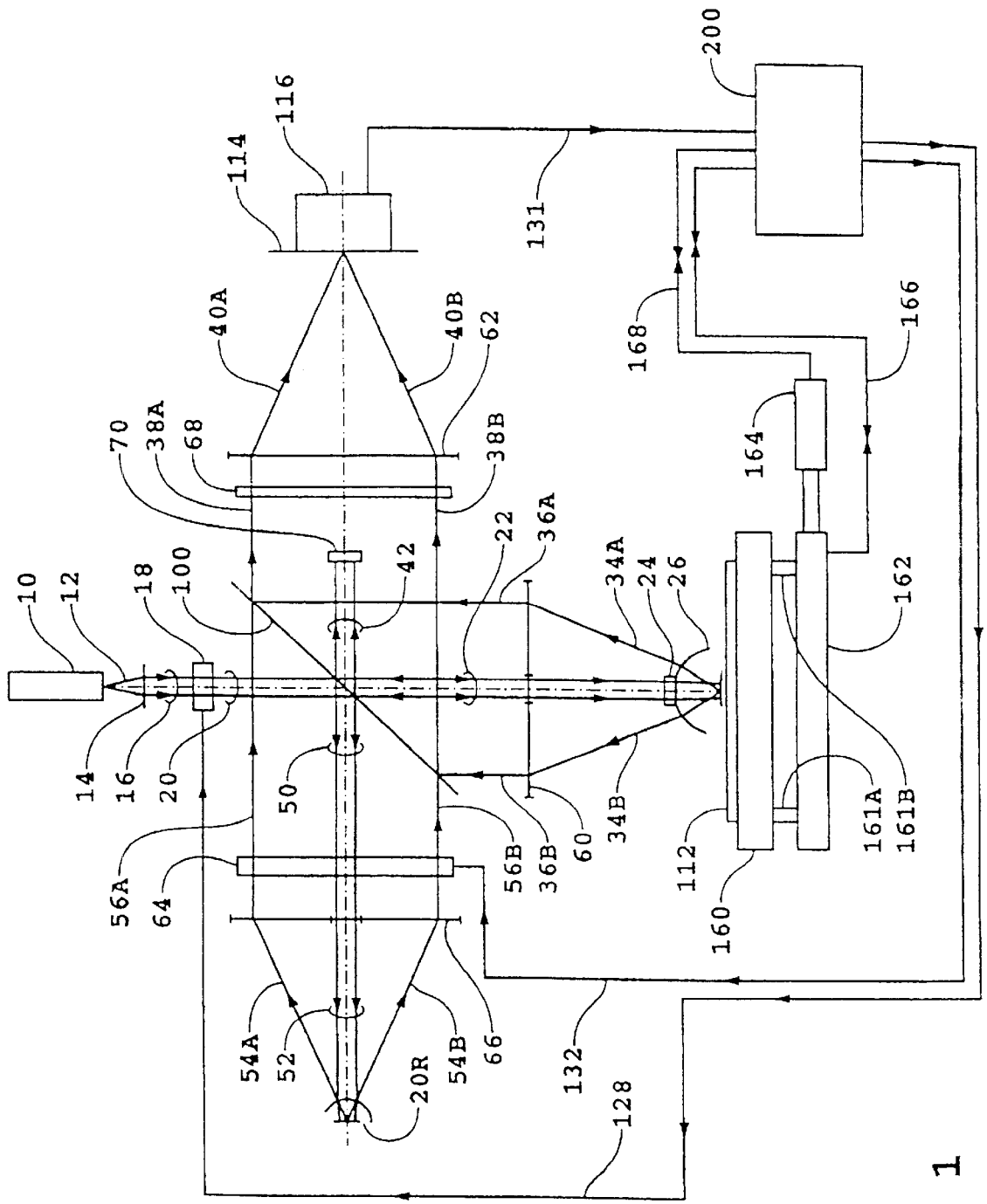
FIG. 1 illustrates, in schematic form, the first embodiment of the present invention.

Referring to the drawings in detail, FIG. 1 depicts in schematic form the first embodiment of the present invention. As shown in FIG. 1, the first embodiment comprises an interferometer, a source 10, object material 112, object material chuck 160, chuck stage 162, translator 164, reference object 20R, and detector 116. The configuration of the interferometer is known in the art as a Michelson interferometer, and is shown as a simple illustration. Other forms of interferometer known in the art such as a polarized Michelson interferometer and as described in an article entitled "Differential Interferometer Arrangements for Distance and Angle Measurements: Principles, Advantages, and Applications," by C. Zanoni (VDI Berichte NR. 749, pp. 93–106, 1989) may be incorporated into the apparatus of FIG. 1 without departing from the spirit and scope of the present invention.

For the first embodiment, light source 10 is preferably a point source or a source of radiation spatially incoherent across the surface of the source, preferably a laser or like source of coherent or partially coherent radiation, and preferably linearly polarized. Light source 10 emits input beam 12. As shown in FIG. 1, input beam 12 enters collimating lens 14 to form input beam 16. Input beam 16 is transmitted by a phase retardation plate 18 as input beam 20. The plane of polarization of input beam 20 is rotated by phase retardation plate 18 to be either parallel or orthogonal to the plane of FIG. 1. However, other orientations of the plane of polarization of input beam 20 may be beneficially used in certain end use applications. The function of phase retardation plate 18 is controlled by signal 128 from electronic controller, signal processor, and computer 200.

Input beam 20 is incident on a non-polarizing beam splitter 100 and a first portion thereof is transmitted as a measurement beam 22. A second portion of input beam 20 incident on beam splitter 100 is reflected as reference beam 50. Measurement beam 22 is transmitted through an aperture in lens 60 and incident on a lens assembly comprising lenses 24 and 26.

Figure 2A:
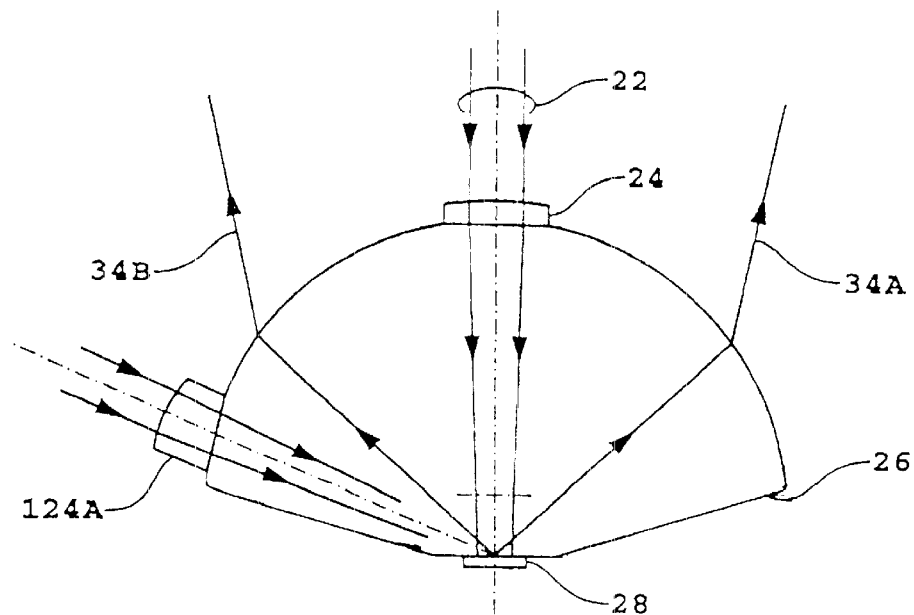
FIG. 2a illustrates, in schematic form, the lens assembly comprising Amici type objective lens 26 and lens 24, as used in the first embodiment, and the lens assembly comprising Amici type objective lens 26 and lens 124, as used in the second embodiment.

The propagation of measurement beam 22 through the lens assembly is shown schematically in an expanded form in FIG. 2a. Lens 26 is an Amici type objective lens. Measurement beam 22 is focused by the lens assembly to a beam diameter at element 28 that encompasses an array of sub-wavelength apertures, an array of sub-wavelength scattering sites, and an array of wavelength apertures in element 28. The portion of element 28 comprising elements 30 and 32 is shown schematically in FIG. 2b in an expanded form on a surface of Amici type objective lens 26.

Figure 2B:
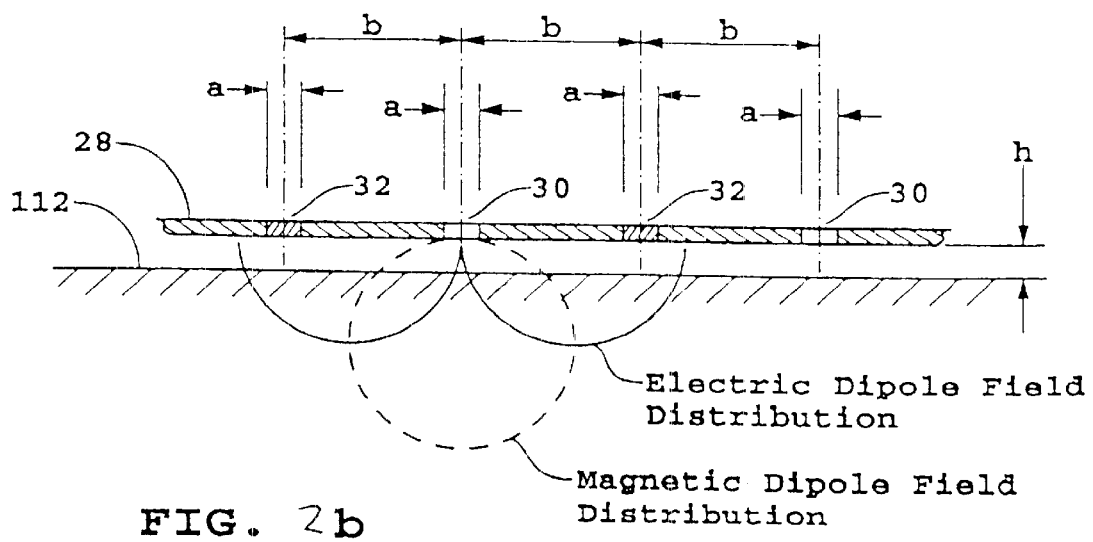
FIG. 2b illustrates, in schematic form, conducting element 28 in relation to object material 112 being profiled/imaged and angular distribution functions of electric far field field components associated with an electric dipole and a magnetic dipole located at a sub-wavelength aperture 30.
Figure 4:
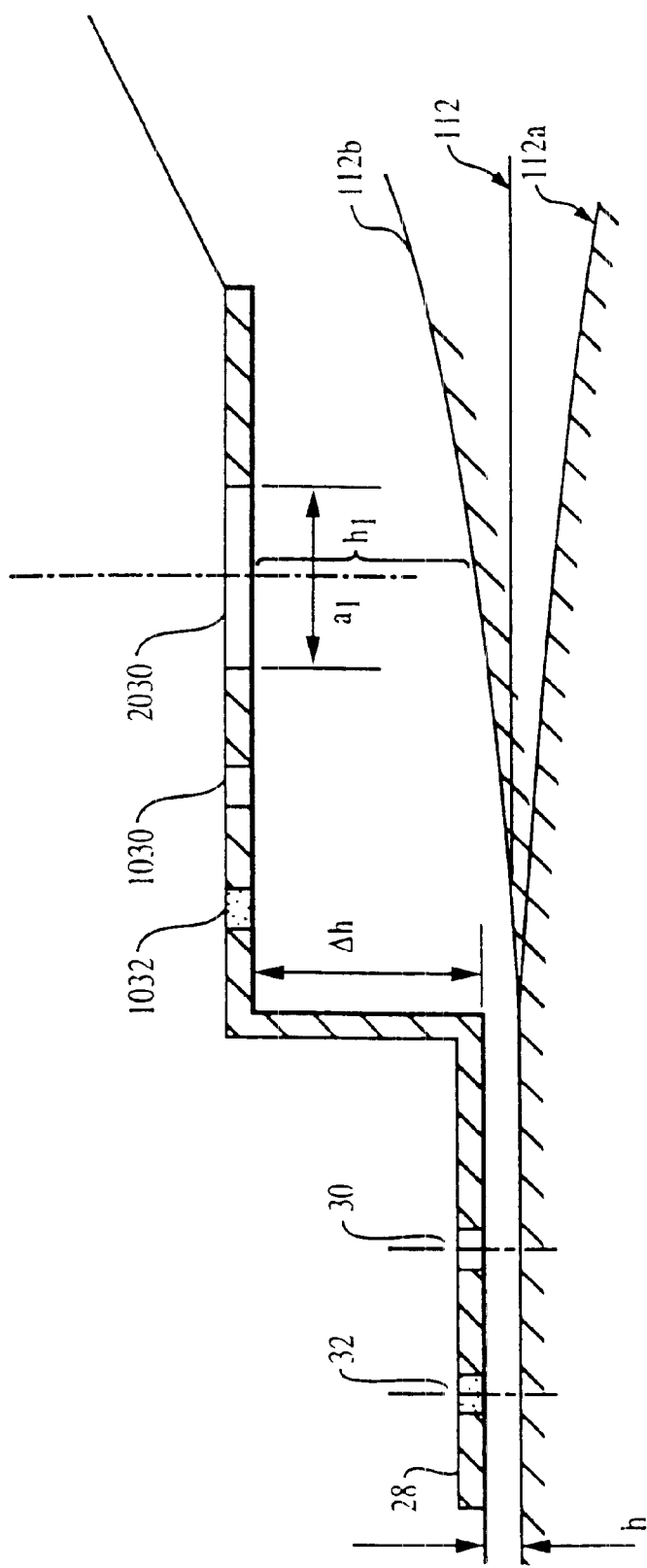
FIG. 4 illustrates, in schematic form, element 28 in relation to object material 112 at the perimeter of element 28.

The sub-wavelength apertures and the sub-wavelength scattering sites are elements 30 and 32, respectively, as indicated in FIG. 2b. Sub-wavelength apertures and the sub-wavelength scattering sites 1030 and 1032, respectively, are indicated in FIG. 4. The wavelength apertures are elements 2030 and are also indicated in FIG. 4. Sub-wavelength scattering sites 32 are preferably non-transmitting elements with a complex index of refraction different from the complex index of refraction of the reflecting material of element 28. The complex indices of refraction are different so that elements 32 effectively serve as sub-wavelength scattering sites. The diameter of elements 30 and 32 is a with $a<\lambda$, preferably $a<<\lambda$, where $\lambda$ is the wavelength of measurement beam 22. The separation of elements 30 and 32 is b with $b>a$, preferably $b>>a$. The thickness of reflecting material of element 28 is of the order of 20 nm and chosen so that the fraction of the probe beam transmitted by sections of element 28 not containing sub-wavelength elements 30 is <<1.

The relative spacing of elements 30 in element 28 is further selected to minimize the effect of one sub-wavelength aperture on the transmission properties a second sub-wavelength aperture. A coupling leading to either an enhancement or a reduction of transmission by an array of sub-wavelength apertures will complicate interpretation of results obtained with the apparatus of the first embodiment.

The diameters of sub-wavelength apertures 30 need not be restricted to a single diameter as shown schematically in FIG. 2b but may beneficially comprise two or more diameters for an end use application. Further, the shapes of sub-wavelength apertures 30 may comprise shapes other than circular, e.g., squares or rectangles without departing from the spirit and scope of the present invention.

The spacing of sub-wavelength apertures 30 need not be restricted to a single value as shown schematically in FIG. 2b but may beneficially comprise two or more different spacings for an end-use application without departing from the spirit and scope of the present invention.

Further, the arrangement of sub-wavelength apertures 30 may be arranged in various geometric patterns or a random pattern without departing from the spirit and scope of the present invention.

The apertures 30 in element 28 can be formed as holes in a mask or as transmissive dielectric regions in an otherwise non-transmissive mask, e.g., transmissive vias in an otherwise reflective element. Moreover, the dielectric material in element 28 defining the apertures 30 can form a waveguide or optical cavity that enhances the transmission of the near-field probe beam to the sample. See, e.g., the previously cited application "Multiple-Source Arrays For Confocal And Near-Field Microscopy." Furthermore, in the presently described embodiment, the mask portion of element 28 is described as conducting to indicate that it is reflective. In other embodiments, element 28 is not necessarily conductive, but is, generally, not transmissive, with the coupling of the near-field probe beams to the sample being accomplished by the apertures 30 in element 28.

The sub-wavelength apertures may further comprise a Fresnel zone plate or a microlens to alter beneficially in certain end use applications the transmission through an array of sub-wavelength apertures without departing from the spirit and scope of the present invention. In certain other end use applications, gratings may be added to an array of wavelength/sub-wavelength apertures operating as spatial filters of reflected/scattered or transmitted near-field probe beam(s) to alter properties of the reflected/scattered or transmitted near-field probe beam(s) without departing from the spirit and scope of the present invention.

A first portion of the measurement beam incident on sub-wavelength apertures 30 is transmitted as a near-field probe beam. A portion of the near-field probe beam is incident on object material 112 and a portion thereof is reflected and/or scattered back to the sub-wavelength apertures 30, and a portion thereof is transmitted as a near-field return probe beam. The spatial separation of adjacent surfaces of object material 112 and reflecting element 28 is h as indicated in FIG. 2b. The value of h is preferably of the order of 2a. A second portion of the measurement beam incident on sub-wavelength apertures 30 is reflected and/or scattered as a first background return beam. A portion of the measurement beam incident on sub-wavelength scattering sites 32 is reflected and/or scattered as a second background return beam. The near-field return probe beam, the first background return beam, and the second background return beam exit Amici type objective lens 26 as a return beam shown by rays 34a and 34b in FIGS. 1 and 2a. The return beam is then collimated by lens 60 as shown by rays 36A and 36B in FIG. 1a.

A portion of the measurement beam not incident on sub-wavelength apertures 30 and scattering sites 32 is reflected as a return measurement beam. The return measurement beam exits lens 24 as a beam substantially parallel to measurement beam 22 and a portion thereof is reflected as a return measurement beam component of beam 42. Beam 42 is incident on and substantially occulted by stop 70.

Reference beam 50 is transmitted by a phase shifter 64, transmitted by an aperture in lens 66, incident on reference object 20R, and reflected as a reflected reference beam shown by rays 54a and 54b in FIG. 1. The reflected reference beam is then collimated by lens 66 and transmitted by phase shifter 64 as shown by rays 56A and 56B in FIG. 1. Phase shifter 64 introduces a relative phase shift $\chi$ in the reflected reference beam as a result of the two transits of reference beam 50 through phase shifter 64. The magnitude of phase shift $\chi$ is controlled by control signal 132 from electronic controller, signal processor, and computer 200.

Figure 2C:
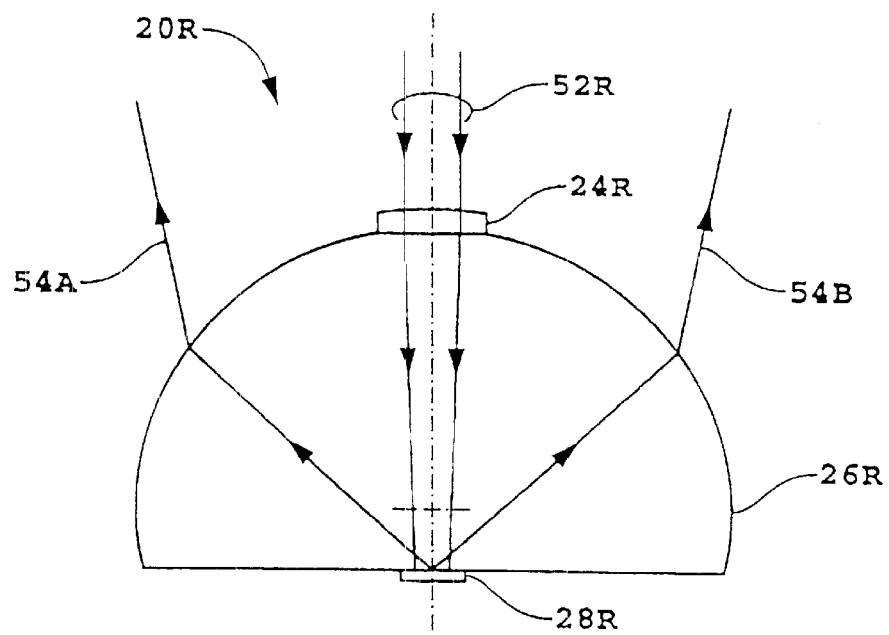
FIG. 2c illustrates, in schematic form, the reference object 20R comprising Amici type objective lens 26R and lens 24R, as used in the first embodiment.
Figure 2D:
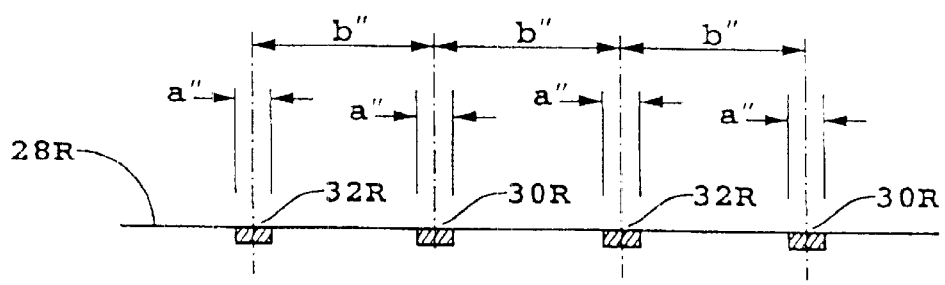
FIG. 2d illustrates, in schematic form, element 28 comprising reflecting elements 30R and 32R used in reference object 20R.

The propagation of reference beam 52 through reference object 20R is shown schematically in an expanded form in FIG. 2c. Reference object 20R includes a lens 24R and an Amici type objective lens 26R. Reference beam 52 (which is shown as reference beam 52R in FIG. 2c) is focused by reference object 20R to a beam diameter at element 28R that encompasses an array of at least two wavelength or sub-wavelength reflecting spots on element 28R. Element 28R is shown schematically in FIG. 2d in an expanded form as an array of reflecting spots 30R and 32R on a surface of Amici type objective lens 26R. As shown in FIG. 2d, the diameter of the reflecting spots is a" and the separation between the reflecting spots is b". Reflecting spots 30R and 32R generate reflected reference beam components of the reflected reference beam that correspond to elements 30 and 32, respectively, of element 28. The spacing of the reflective spots 30R and 32R and the focal length of lens 66 are chosen such that reflective spots 30R and 32R and elements 30 and 32, respectively, are conjugates as seen by a subsequent imaging onto a detector. The diameter a" of the reflective spots 30R and 32R is chosen to efficiently generate the reflected reference beam with a diameter substantially the same as the diameter of return beam 36. The relative reflectivities of reflecting spots 30R and 32R may be the same or beneficially different depending on an end use application.

It will be evident to those skilled in the art that the path of the reference beam could be configured such that the reference beam is transmitted by a reference object 20R having an element which is complimentary to element 28R of the first embodiment without departing from the spirit and the scope of the present invention. Examples of the generation of a reference beam by transmitting beams through wavelength and/or sub-wavelength apertures is described in cited U.S. Provisional Application by Hill entitled "Multiple-Source Arrays With Optical Transmission Enhanced By Resonant Cavities."

The return beam is incident on beam splitter 100 and a portion thereof is reflected as a return beam component of a combined beam shown by rays 38A and 38B in FIG. 1a. The reflected reference beam is incident on beam splitter 100 and a portion thereof is transmitted as a reflected reference beam component of the combined beam. The combined beam is mixed with respect to polarization by polarizer 68, then incident on lens 62, and focused as a mixed beam shown by rays 40A and 40B in FIG. 1a. The mixed beam is focused onto a pinhole plane 114 such that a pinhole in image plane 114 is a conjugate image of either one of the sub-wavelength apertures 30 or one of sub-wavelength scattering points 32.

Figure 3:
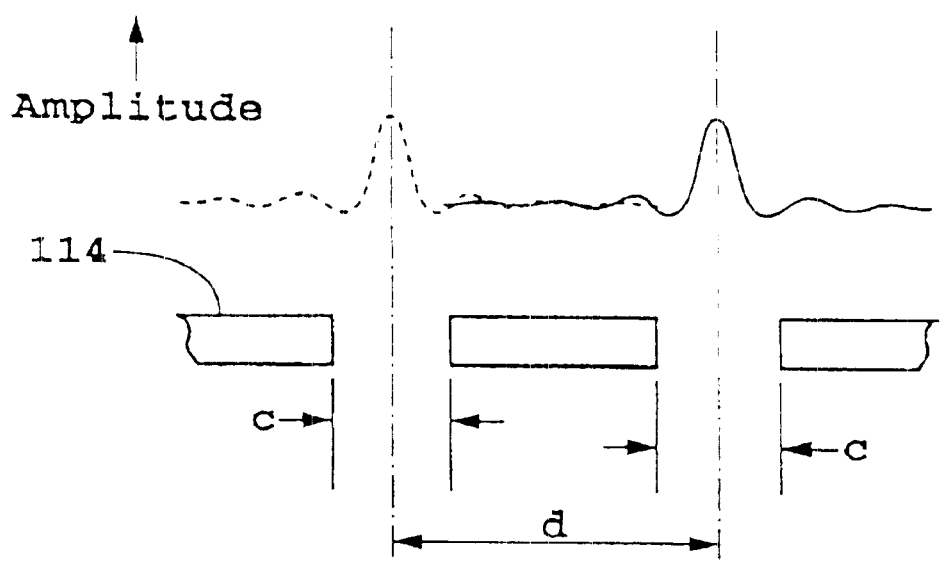
FIG. 3 illustrates, in schematic form, image plane 114 and amplitude distribution functions for images of a sub-wavelength aperture 30 and a sub-wavelength scattering site 32 at respective pinholes in image plane 114.

Pinhole plane 114 is shown schematically in FIG. 3. The diameter of the pinholes is c and the spacing between the pinholes is d. The spacing d is equal to the separation b of sub-wavelength apertures 30 and sub-wavelength scattering sites 32 times the magnification of the imaging system imaging the sub-wavelength apertures 30 and sub-wavelength scattering points 32 onto corresponding pinholes in pinhole plane 114. Diameter c is selected to be approximately twice the size of a diffraction limited image of a point object by the imaging system and the spacing d is selected to be larger than c, preferably $\geq$ to approximately four times the size of a diffraction limited image of a point object by the imaging system. Typical amplitude functions of diffraction limited images of sub-wavelength apertures 30 and sub-wavelength scattering sites 32 are shown in FIG. 3 as a dashed and solid profiles, respectively.

A portion of the mixed beam is transmitted by the pinholes in pinhole plane 114 and detected by a detector 116, preferably by a quantum photon detector. Detector 116 comprises an array of pixels, comprising either a pair of pixels, a one dimensional array of pixels, or a two dimensional array of pixels according to the requirements of an end-use application, with a one-to-one mapping of pinholes in pinhole plane 114 to the pixels of detector 116. Detector 116 generates an electrical interference signal comprising an array of signal values $[S_n]$ corresponding to the array of pixels. Subscript n is an index indicating an element in the array of signal values $[S_n]$. The array of signal values $[S_n]$ may comprise a pair of elements, a one-dimensional array comprising at least three elements, or a two-dimensional array depending on an end-use application.

The array of signal values $[S_n]$ may be written to a good approximation as $$[S_n] = [(S_D + S_I)_n] \quad (1)$$

where term $(S_D)_n$ represents terms either associated with sub-wavelength apertures 30 or associated with sub-wavelength apertures 32 and term $(S_I)_n$ represents interference cross terms either associated with sub-wavelength apertures 30 or associated with sub-wavelength apertures 32.

A $(S_D)_n$ term associated with sub-wavelength apertures 30 is proportional to the sum of the squares of the amplitudes of the corresponding portions of the near-field return probe beam, of the first background return beam, and of the reflected reference beam and interference cross terms between complex amplitudes of the near-field return probe beam and of the first background return beam. A $(S_D)_n$ term associated with sub-wavelength apertures 32 is proportional to the sum of the squares of the amplitudes of the corresponding portions of the second background return beam and of the reflected reference beam. A $(S_I)_n$ term associated with sub-wavelength apertures 30 is proportional to the sum of the interference cross terms between complex amplitudes of the near-field return probe beam and of the reflected reference beam and between complex amplitudes of the first background return beam and of the reflected reference beam. A $(S_I)_n$ term associated with sub-wavelength apertures 32 is proportional to the interference cross term between complex amplitudes of the second background return beam and of the reflected reference beam.

Term $(S_D)_n$ is independent of phase shift $\chi$. Term $(S_I)_n$ is a sinusoidal function of phase shift $\chi$ and may be written as $$(S_I)_n = (|S_I|\cos(\phi + \chi))_n \quad (2)$$

where $(|S_I|)_n$ and $\phi$ are an amplitude and phase, respectively, related to the complex amplitudes contributing to $(S_I)_n$.

Operation of the apparatus of the first embodiment of the present invention depicted in FIGS. 1a, 2a, and 2b is based on the acquisition of a sequence of four measurements of arrays of signal values. The sequence of the four arrays of signal values $[S_n]_1$, $[S_n]_2$, $[S_n]_3$, and $[S_n]_4$ is obtained by detector 116 with phase shifter 64 introducing a sequence of phase shifts $\chi_0$, $\chi_0+\pi$, $\chi_0+\pi/2$, and $\chi_0+3\pi/2$ radians, respectively, where $\chi_0$ is some fixed value of phase shift $\chi$. The four arrays of signal values $[S_n]_1$, $[S_n]_2$, $[S_n]_3$, and $[S_n]_4$ are sent to electronic controller, signal processor, and computer 200 as signal 131, in either digital or analog format, for subsequent processing.

Conventional conversion circuitry, i.e., analog-to-digital converters, is included in either detector 116 or electronic controller, signal processor, and computer 200 for converting the four arrays $[S_n]_1$, $[S_n]_2$, $[S_n]_3$, and $[S_n]_4$ to a digital format. Phase shift $\chi$ introduced by phase shifter 64 is controlled by signal 132 where signal 132 is generated and subsequently transmitted by electronic controller, signal processor, and computer 200. Phase shifter 64 can be of an electro-optical type.

Next, two arrays of signal value differences $[S_n]_1-[S_n]_2=[(S_I)_n]_1-[(S_I)_n]_2$ and $[S_n]_3-[S_n]_4=[(S_I)_n]_3-[(S_I)_n]_4$ are computed by electronic controller, signal processor, and computer 200.

Elements of the arrays of signal value differences corresponding to pixels that are associated with sub-wavelength apertures 30 contain substantially and with relatively high efficiency only two interference cross terms, a first interference cross term between the complex amplitude of the near-field return probe beam and of the complex amplitude of the reflected reference beam and a second interference cross term between the complex amplitude of the first background return beam and of the complex amplitude of the reflected reference beam.

Elements of the arrays of signal value differences corresponding to pixels that are associated with sub-wavelength scattering sites 32 contain substantially and with relatively high efficiency only the interference cross term between the complex amplitude of the second background return beam and of the complex amplitude of the reflected reference beam.

The relatively high efficiency for isolation of effects of amplitudes of beams associated with sub-wavelength apertures 30 and sub-wavelength scattering sites 32 in the measured intensity values is controlled by the choice of parameters c and d.

The complex amplitude of the near-field return probe beam is computed by electronic controller, signal processor, and computer 200 from the amplitude of the first interference term between the complex amplitude of the near-field return probe beam and the amplitude of the reflected reference beam. The computation comprises using measured values of the interference cross terms between components of the complex amplitude of the second background return beam and components of the complex amplitude of the reflected reference beam to compensate the measured values of elements of signal value differences associated with sub-wavelength apertures 30 for the contribution of the second interference cross terms between components of the complex amplitude of the first background return beam and components of the complex amplitude of the reflected reference beam. The computation further comprises using measured values for the square of the amplitudes of the portions of the reflected reference beam transmitted by the pinholes of pinhole plane 114 and detected by detector 116.

Next, the plane of polarization of input beam 20 is rotated by 90° by phase retardation element 18 in response to signal 128 from electronic controller, signal processor, and computer 200. A second set of four arrays of signal values $[S_n]_5$, $[S_n]_6$, $[S_n]_7$, and $[S_n]_8$ corresponding to measured arrays of signal values $[S_n]_1$, $[S_n]_2$, $[S_n]_3$, and $[S_n]_4$ are obtained by detector 116. Arrays of signal value differences $[S_n]_1-[S_n]_2=[(S_I)_n]_1-[(S_I)_n]_2$ and $[S_n]_3-[S_n]_4=[(S_I)_n]_3-[(S_I)_n]_4$ are computed by electronic controller, signal processor, and computer 200. The complex amplitude of the near-field return probe beam for the orthogonally polarized input beam 20 is computed by electronic controller, signal processor, and computer 200 by the same algorithm as used to compute the complex amplitude of the near-field return probe beam for the non-rotated state of polarization of input beam 20.

Object material 112 is mounted on an object chuck 160. The angular orientation and height of object chuck 160 is controlled by three transducers, two of which are shown as 161A and 161B, that are attached to chuck stage 162. The angular orientation and height of object material 112 relative to the surface of element 28 are detected and used to generate error signals. The detection and generation of the error signals is based on information obtained from Arrays of signal values corresponding to sub-wavelength apertures and the sub-wavelength scattering sites 1030 and 1032, respectively, and the wavelength-aperture elements 2030 that are illustrated in FIG. 4.

The error signals are transmitted as a component of signal 166 to electronic controller, signal processor, and computer 200. Servo control signals are generated by electronic controller, signal processor, and computer 200 from the error signals and transmitted as a servo control signal component of signal 166 to chuck stage 162. Transducers 161A, 161B, and the third transducer (not shown) alter the orientation and/or height of object material 112 according to the servo control signal component of signal 166.

The location of chuck stage 162 in a plane substantially parallel to the surface of element 28 is controlled by translator 164. The location of chuck stage 162 is detected by known techniques in the art such as precision distance measuring interferometry and error signals transmitted as an error signal component of signal 168 to electronic controller, signal processor, and computer 200. [See U.S. patent application with Ser. No. 09/252,266 entitled "Interferometer And Method For Measuring The Refractive Index And Optical Path Length Effects Air" by Peter de Groot, Henry A. Hill, and Frank C. Demarest filed Feb. 18, 1999 and U.S. patent application with Ser. No. 09/252,266 entitled "Apparatus And Method For Measuring The Refractive Index And Optical Path Length Effects Of Air Using Multiple-Pass Interferometry" by Henry A. Hill, Peter de Groot, and Frank C. Demarest filed Feb. 18, 1999. The contents of both applications are incorporated herein by reference.] Servo control signals are generated by electronic controller, signal processor, and computer 200 from the error signal component of signal 168 and transmitted as a servo signal component of signal 168 to translator 164. Translator 164 controls the location and orientation of chuck stage 162 in one or two orthogonal directions and in one or two orthogonal planes of orientation, according to the requirements of an end use application, in response to the servo signal component of signal 168.

Next, the object material 112 is scanned in a combination of one or two orthogonal directions substantially parallel to the surface of object material 112 and in the spatial separation of the element 28 from the adjacent surface of object material 112 according to the requirements of an end-use application. Measured arrays of signal values $[S_n]_1$, $[S_n]_2$, $[S_n]_3$, and $[S_n]_4$ and, if required by an end-use application, measured arrays of signal values $[S_n]_5$, $[S_n]_6$, $[S_n]_7$, and

[S$_n$]$_8$ are obtained as a function of the scanned parameters and the amplitudes and phases of the respective interference cross terms between the complex amplitude of the respective near field return probe beam and of the respective complex amplitude of the reflected reference beam computed by electronic controller, signal processor, and computer 200.

Information with apparatus of the first embodiment about object material 112 is acquired in the presence of a significantly reduced background signal. Sources of contributions to the background signal comprise the first background return beam, a portion of the return measurement beam not occulted by stop 70, a background produced by reflection and/or scattering of other beams associated with the measurement beam in the apparatus of the first embodiment, and corresponding beams associated with the reflected reference beam. The background signal is significantly reduced first because the apparatus of the first embodiment comprises a confocal optical imaging/detecting system and second because of the background compensation procedure based on measurement of the second background return beam.

It is well known to those in the art that confocal optical imaging/detecting systems have significantly improved depth discrimination in relation to non-confocal optical imaging/detecting systems and therefore significantly improved discrimination against scattered/reflected beams generated in plane sections displaced from the plane section being imaged. However, confocal optical imaging/detecting systems do not discriminate against the first background return beam. The background compensation procedure based on measurement of the second background return beam compensates for the first background return beam that is not discriminated against by the confocal imaging/detecting properties of the apparatus of the first embodiment. It should be noted that The background compensation procedure based on measurement of the second background return beam further compensates for the scattered/reflected beams generated in plane sections displaced from the plane section being imaged not discriminated against by the confocal imaging/detecting properties of the apparatus of the first embodiment.

The scanning of object material 112 in a combination of one or two orthogonal directions substantially parallel to the surface of object material 112 and in the spatial separation of the element 28 from the adjacent surface of object material 112 is implemented for the first embodiment as a "step and repeat" mode. The first embodiment modified for a continuous scanning mode of operation is subsequently described as the third variant of the first embodiment of the present invention.

The detection and generation of the error signals is based on information obtained from an array of wavelength-apertures 2030 located at the perimeter of element 28. The diameter of wavelength-apertures 2030 is a$_1$ with a$_1 \approx \lambda$. As illustrated in FIG. 4, the plane of wavelength-apertures 2030 are displaced by a distance Δh from the plane of elements 30 and 32 with Δh≈2λ. A portion of the measurement beam incident on element 2030 is transmitted as a probe beam. A portion of the probe beam is incident on object material 112 and a portion thereof is reflected and/or scattered back to the sub-wavelength apertures 1030, and a portion thereof is transmitted as a return probe beam. A portion of the measurement beam incident on element 1032 is scattered/reflected as a component of the second background return beam.

The return probe beam is detected as certain elements of measured arrays of signal values [S$_n$]. The measured arrays also include signal values corresponding to sub-wavelength apertures and the sub-wavelength scattering sites 1030 and 1032, respectively, and the wavelength-aperture elements 2030 that are illustrated in FIG. 4.

Signal value differences [S$_n$]$_1$–[S$_n$]$_2$ and [S$_n$]$_3$–[S$_n$]$_4$ corresponding to the certain elements of the measured arrays are computed by electronic controller, signal processor, and computer 200 and compensated for by the corresponding components of the first background return beam. Information obtained associated with elements 1032 is used in the compensation. The compensated signal value differences corresponding to the certain elements is used to monitor the relative separation h$_1$ of elements 2030 and corresponding sites on object material 112 (see FIG. 4).

The measured array of height values [h$_1$] is used to generate the error signals transmitted to electronic controller, signal processor, and computer 200 as a component of signal 166. Because of the diameter of element 2030, the error signal generation procedure retains a relatively high sensitivity over a range of height values of the order of 10λ to 30λ. Because of the relatively large height range, the error signals can be effectively used in an approach of element 28 to element 112.

In addition, as the object material 112 is scanned, the "leading edge" of element 28 monitors the corresponding elements of array of height values [h$_1$] and detects any change in surface profile of element 112. In FIG. 4, three different surface shapes for element 112 are shown as a flat surface indicated with element number 112, a convex surface indicated with element number 112a, and a concave surface indicated with element number 112b. The detection of changes in surface profile are then anticipated in the servo control system so as to prevent contact of element 28 with element 112 and maintain at least one portion of element 112 at a desired height level.

It will be evident to those skilled in the art that additional sets of wave-length apertures 2030 having different diameters and associated displacements Δh without departing from the scope and spirit of the present invention.

A first variant of the first embodiment of the present invention comprises the same elements as the first embodiment of the present invention as shown schematically in FIG. 1. The difference between the first variant of the first embodiment and the first embodiment is in the procedure used to acquire the measured arrays of signal values. In the first variant of the first embodiment, the amplitude (|S$_l$|)$_n$ and phase (ϕ)$_n$ are determined using known heterodyne detection techniques or phase sensitive detection techniques for non-pulsed signals such as a digital Hubert transform phase detector [see "Phase-locked loops: theory, design, and applications" 2nd ed. (McGraw-Hill, New York) 1993, by R. B. Best], a phase-locked loop [see R. E. Best, ibid.], a sliding window FFT [see *Digital Techniques for Wideband Receivers*, (Artech House, Boston) 1995, by J. Tsui using phase χ as the reference phase.

It is known for a function sampled uniformly in time that an implementation of a phase sensitive technique based on digital signal processing for acquisition of information on the function yields results based on a Chebyshev polynomial representation of the function [see H. A. Hill and R. T. Stebbins, Astrophys. J., 200, p 484 (1975)]. Consider the example of phase χ being scanned about an offset χ$_0$ so that $$\chi = \chi_0 + \Delta\chi \quad (3)$$

where Δχ is some function of time t. The scanning of χ generates components in elements of an array of signal values according to the Eqs. (2) and (3) expressed as $$(S_l)_n = (|S_l|\cos(\phi+\chi_0))_n \cos\Delta\chi - (|S_l|\sin(\phi+\chi_0))_n \sin\Delta\chi. \quad (4)$$

The amplitude array $[(|S_I|)_n]$ and phase array $[(\phi+\chi_0)_n]$ are then obtained by way of phase sensitive detection of the coefficient arrays of $\cos \Delta\chi$ and $\sin \Delta\chi$. The phase sensitive detection comprises multiplying $(|S_I|)_n$ by $\cos \Delta\chi$ and integrating $(|S_I|)_n \cos \Delta\chi$ with respect to time and multiplying $(|S_I|)_n$ by $\sin \Delta\chi$ and integrating $(|S_I|)_n \sin \Delta\chi$ with respect to time. For the case of $\Delta\chi$ being a sinusoidal function at an angular frequency $\omega_1$ with an amplitude 1, i.e., $$\Delta\chi = \cos \omega_1 t, \tag{5}$$

and $[(|S_I|)_n]$ sampled uniformly in time, the coefficient arrays of $\cos \Delta\chi$ and $\sin \Delta\chi$ can be expressed effectively as arrays of certain Chebyshev polynomial coefficients of $[(|S_I|)_n]$.

Elements of the arrays of certain Chebyshev polynomial coefficients can be expressed using known properties of Chebyshev polynomial as $$(|S_I|\cos(\varphi+\chi_0))_n = \frac{4}{T[1+J_0(2)]}\int_{-T/2}^{T/2}(S_I)_n \cos\Delta\chi\, dt \tag{6}$$

$$= \frac{4}{[1+J_0(2)]}\int_{-1}^{1}\frac{(S_I)_n T_1(\Delta\chi)}{([1-(\Delta\chi)^2])^{1/2}}d\Delta\chi,$$

$$(|S_I|\sin(\varphi+\chi_0))_n = -\frac{4}{T[1+J_0(2)]}\int_{-T/2}^{T/2}(S_I)_n \sin\Delta\chi\, dt \tag{7}$$

$$= -\frac{4}{[1+J_0(2)]}\int_{-1}^{1}\frac{(S_I)_n V_1(\Delta\chi)}{([1-(\Delta\chi)^2])^{1/2}}d\Delta\chi$$

where $T=2\pi/\omega_1$, $T_1$ and $V_1$ are order 1 Chebyshev polynomials of type I and type II, respectively, and $J_0$ is the order 0 Bessel function of the first kind [see Section 13.3 of *Mathematical Methods for Physicists* by G. Arfken (Academic Press-New York) 1968].

The phase offset $\chi_0$ generally need not be determined other than meet the condition that it not be variable during a period of scanning object material 112. To compare results obtained at different times, it may be necessary to determine any change that may have occurred in $\chi_0$ during the period between the two different measurement times. Relative changes in $\chi_0$ can be determined for example by acquiring arrays of amplitudes $[(|S_I|)_n]$ and phases $[(\phi)_n]$ in array $[S_n]$ for object material 112 comprising an isotropic medium, e.g., fused silica, with a surface flat to requisite accuracy.

The first variant of the first embodiment has the advantage of a heterodyne detection system.

The remaining description of the first variant of the first embodiment is the same as corresponding portions of the description given for the first embodiment. Additional reflection and/or scattering properties of object material 112 may be obtained by a second embodiment of the present invention wherein near-field probe beams are used that are different from the near-field probe beams used in the first embodiment because the measurement beam is incident on mask element 28 at an angle, as shown in FIG. 2a, where the measurement beam passes through lens 124A in order to contact mask element 28.

A first portion of the measurement beam incident on sub-wavelength apertures 30 is transmitted as a modified near-field probe beam. The primary difference between the modified near field probe beam of the second embodiment and the near-field probe beam of the first embodiment is a difference in near-field multipole composition. The near-field multipole composition of a near-field probe beam of the first embodiment comprises a significant near-field term associated with a magnetic dipole located at a corresponding aperture of apertures 30.

The near-field multipole composition of a near-field probe beam of the second embodiment comprises significant near-field terms associated with both magnetic dipoles and an electric dipole located at a corresponding aperture of apertures 30 [see J. D. Jackson, *Classical Electrodynamics*, Chapter 9, $2_{nd}$ Ed. (Wiley-New York) (1975); "Diffraction Theory," C. J. Bouwkamp, *Reports on Progress in Physics*, 17, pp. 35–100, ed. A. C. Strickland, The Physical Society (1954)]. Because of differences in spatial properties of near-fields associated with a magnetic dipole and spatial properties of near-fields associated with an electric dipole (see FIG. 2b for distributions of certain components of electric fields associated with magnetic dipole aligned to the plane of conducting element 28 and electric dipole orientated orthogonal to the plane of conducting element 28), the complex amplitude of the near-field return probe beam measured by the second embodiment is different from the complex amplitude of the near-field return probe beam measured by the first embodiment. As a consequence, the complex amplitude of the near-field return probe beam measured by the second embodiment represents an "image" of a three dimensional volume section of object material 112 that is different from a corresponding image of object material 112 represented by the complex amplitude of the near-field return probe beam measured by the first embodiment.

The remaining description of the second embodiment is the same as corresponding portions of the description given for the first embodiment.

Further embodiments of the invention include adapting the systems described above to operate in a transmission mode. Once such embodiment is shown in FIG. 5.

Many elements of the embodiment shown in FIG. 5 perform similar functions as elements of the earlier embodiment and are indicated in FIG. 5 with the same element numbers as corresponding elements of the first embodiment shown in FIG. 1.

Beam 20 is incident on non-polarizing beam splitter 102, and a first portion thereof is transmitted as measurement beam 22T. Measurement beam 22T is next reflected by mirror 92 and then focused to a spot on substrate 112T by lens 24T. Substrate 112T comprises a transparent substrate at the wavelength of beam 20 and an array of wavelength and/or sub-wavelength apertures corresponding to apertures 30 of the first embodiment. A portion of measurement beam 22T focused to the spot is transmitted by the sub-wavelength apertures 30 as an array of near-field probe beams. The description of the sub-wavelength apertures 30 is the same as the corresponding portion of the description given for the array of sub-wavelength apertures 30 of the first embodiment. The diameter of the spot is large enough span the array of sub-wavelength apertures 30. The sample to be examined by the array of near-field beams corresponds to transparent substrate 112T and can be placed on the flat surface of Amici type lens 26T. The array of near-field probe beams is transmitted by the sample as a transmitted beam as shown by rays 34A and 34B in FIG. 5 and corresponding to the beam shown by rays 34A and 34B in FIG. 1 of the first embodiment with respect to subsequent processing by the apparatus of the fifth embodiment.

A second portion of beam 20 is reflected by mirror 102 as reference beam 50T, as shown in FIG. 5. Reference beam 50T is transmitted through an aperture in lens 60 as reference beam 52 after reflection by mirrors 94A, 94B, and 94C. The description of reference beam 52 is the same as corresponding portions of the description given for beam 52 of the first embodiment.

Furthermore in additional embodiments, radiation directed through the periphery apertures 2030 may be at a different wavelength than that of the measurement apertures 30.

Other aspects, advantages, and modifications are within the scope of the following claims.

What is claimed is:

1. An interferometric optical microscopy system for imaging an object, the system comprising:

a beam splitter positioned to separate an input beam into a measurement beam and a reference beam;

a measurement beam source array positioned to receive the measurement beam, the measurement beam source array comprising a mask having an array of measurement apertures and a control aperture adjacent one of the measurement apertures, wherein the control aperture has transverse dimensions larger than the transverse dimensions of the adjacent measurement aperture, and wherein each of the measurement apertures and the control aperture is configured to radiate a portion of the measurement beam to the object, the object interacting with the radiated measurement beam portions to direct signal radiation back through the measurement apertures to define a measurement return beam, wherein the transverse dimensions of the control aperture cause the signal radiation directed back through the measurement aperture adjacent the control aperture to be dominated by radiation derived from the control aperture;

a reference beam source array positioned to receive the reference beam, the reference beam source array comprising an array of elements each configured to radiate a portion of the reference beam, the radiated reference beam portions defining a reference return beam;

a multi-element photo-detector;

imaging optics positioned to direct the measurement and reference return beams to the photo-detector and configured to produce overlapping conjugate images of the array of reference elements and the array of measurement apertures on the photo-detector, wherein the conjugate image for each measurement aperture overlaps with the conjugate image of a corresponding reference element to produce an optical interference signal indicative of a particular region of the object.

2. The system of claim 1, further comprising:

a positioning system for supporting the object relative to the measurement beam source array; and an electronic controller coupled to the photo-detector and the positioning system, wherein during operation the electronic controller causes the positioning system to adjust the separation between the measurement beam source array and the object in response to a control signal derived from the interference signal corresponding to the measurement aperture adjacent the control aperture.

3. The system of claim 1, wherein the control aperture is located at the periphery of the array of measurement apertures.

4. The system of claim 3, wherein an end adjacent the object of each measurement aperture other than the measurement aperture adjacent the control aperture lie in a first common plane, and wherein an end adjacent the object of each of the control aperture and the measurement aperture adjacent the control aperture is displaced relative to the first common plane.

5. The system of claim 4, wherein the ends of the control aperture and the measurement aperture adjacent the control aperture lie in a second common plane parallel to the first common plane.

6. The system of claim 5, further comprising a source providing the input beam, and wherein the input beam comprises a wavelength and the first common plane is displaced from the second common plane by an amount equal to about twice the wavelength.

7. The system of claim 1, wherein the mask comprises multiple control apertures each adjacent one of the measurement apertures, and wherein each control aperture has transverse dimensions larger than the transverse dimensions of the corresponding adjacent measurement aperture.

8. The system of claim 7, wherein the multiple control apertures surround the periphery of the array of the measurement apertures.

9. The system of claim 1, further comprising a source for providing the input beam.

10. The system of claim 9, wherein each of the measurement apertures has a transverse dimension less than a vacuum wavelength of the input beam provided by the source.

11. The system of claim 9, wherein the control aperture has a transverse dimension greater than or equal to the vacuum wavelength of the input beam.

12. The system of claim 1, further comprising a pinhole array positioned adjacent the photo-detector, wherein each pinhole is aligned with a separate set of one or more detector elements, and wherein the imaging system causes the conjugate image for each measurement aperture to align with a corresponding pinhole of the pinhole array.

13. The system of claim 1, wherein the mask in the measurement beam source array further comprises an array of measurement scattering elements, wherein each measurement scattering element is adjacent a corresponding one of the measurement apertures and has transverse dimensions comparable to the corresponding measurement aperture, and wherein each measurement scattering element scatters a portion of the measurement beam, the measurement return beam further comprising the portions of the measurement beam scattered by the measurement scattering elements, and wherein the imaging optics are further configured to produce a conjugate image of the array of measurement scattering elements that overlaps with the conjugate image of the array of reference elements, wherein the conjugate image for each measurement scattering element overlaps with the conjugate image of a corresponding reference element to produce an optical interference signal indicative of scattering from the adjacent measurement aperture.

14. The system of claim 13, wherein the control aperture is located at the periphery of the array of measurement apertures, and wherein an end adjacent the object of each measurement aperture and each measurement scattering element other than the measurement aperture adjacent the control aperture and the measurement scattering element adjacent the measurement aperture adjacent the control aperture lie in a first common plane, and wherein an end adjacent the object of each of the control aperture, the measurement aperture adjacent the control aperture, and the measurement scattering site adjacent the measurement aperture adjacent the control aperture is displaced relative to the first common plane.

15. The system of claim 14, wherein the ends of the control aperture and the measurement aperture adjacent the control aperture lie in a second common plane parallel to the first common plane.

16. The system of claim 15, further comprising a source providing the input beam, and wherein the input beam comprises a wavelength and the first common plane is displaced from the second common plane by an amount equal to about twice the wavelength.

17. The system of claim 13, further comprising:
a positioning system for supporting the object relative to the measurement beam source array; and
an electronic controller coupled to the photo-detector and the positioning system, wherein during operation the electronic controller causes the positioning system to adjust the separation between the measurement beam source array and the object in response to a control signal derived from the interference signal corresponding to the measurement aperture adjacent the control aperture and the interference signal corresponding to the measurement scattering site adjacent the measurement aperture adjacent the control aperture.

18. The system of claim 13, further comprising a pinhole array positioned adjacent the photo-detector, wherein each pinhole is aligned with a separate set of one or more detector elements, and wherein the imaging system causes the conjugate image for each measurement aperture and each measurement scattering element to align with a corresponding pinhole of the pinhole array.

19. The system of claim 1, wherein each reference element comprises a reflective element.

20. The system of claim 1, wherein each reference element comprises a transmissive aperture.

21. A source array for illuminating an object, the source array comprising:
a mask positioned to receive a measurement beam, the mask having an array of source apertures and a control aperture adjacent one of the source apertures, wherein the control aperture has transverse dimensions larger than the transverse dimensions of the adjacent source aperture, and wherein each of the source apertures and the control aperture is configured to radiate a portion of the measurement beam to the object, the object interacting the radiated measurement beam portion from the control aperture to direct control signal radiation back through the source aperture adjacent the control aperture; and
a source for providing the measurement beam,
wherein the control aperture has a transverse dimension greater than or equal to the vacuum wavelength of the input beam.

22. A system for illuminating an object, the system comprising:
a source array comprising a mask positioned to receive a measurement beam, the mask having an array of source apertures and a control aperture adjacent one of the source apertures, wherein the control aperture has transverse dimensions larger than the transverse dimensions of the adjacent source aperture, and wherein each of the source apertures and the control aperture is configured to radiate a portion of the measurement beam to the object, the object interacting the radiated measurement beam portion from the control aperture to direct control signal radiation back through the source aperture adjacent the control aperture;
a positioning system for supporting the object relative to the source array; and
an electronic controller coupled to the positioning system, wherein during operation the electronic controller causes the positioning system to adjust the separation between the source array and the object in response to a control signal based on an interference signal derived from the control signal radiation.

23. The system of claim 22, wherein the control aperture is located at the periphery of the array of source apertures.

24. The system of claim 22, wherein the mask comprises multiple control apertures each adjacent one of the source apertures, and wherein each control aperture has transverse dimensions larger than the transverse dimensions of the corresponding adjacent source aperture.

25. The system of claim 22, further comprising a source for providing the measurement beam.

26. The system of claim 25, wherein each of the source apertures has a transverse dimension less than a vacuum wavelength of the measurement beam provided by the source.

27. The system of claim 25, wherein the control aperture has a transverse dimension greater than or equal to the vacuum wavelength of the input beam.

28. A source array for illuminating an object, the source array comprising:
a mask positioned to receive a measurement beam, the mask having an array of source apertures and a control aperture adjacent one of the source apertures, wherein the control aperture has transverse dimensions larger than the transverse dimensions of the adjacent source aperture, and wherein each of the source apertures and the control aperture is configured to radiate a portion of the measurement beam to the object, the object interacting the radiated measurement beam portion from the control aperture to direct control signal radiation back through the source aperture adjacent the control aperture,
wherein the mask comprises multiple control apertures each adjacent one of the source apertures, and wherein each control aperture has transverse dimensions larger than the transverse dimensions of the corresponding adjacent source aperture, and
wherein the multiple control apertures surround the periphery of the array of the source apertures.

29. A source array for illuminating an object, the source array comprising:
a mask positioned to receive a measurement beam, the mask having an array of source apertures and a control aperture adjacent one of the source apertures, wherein the control aperture has transverse dimensions larger than the transverse dimensions of the adjacent source aperture, and wherein each of the source apertures and the control aperture is configured to radiate a portion of the measurement beam to the object, the object interacting the radiated measurement beam portion from the control aperture to direct control signal radiation back through the source aperture adjacent the control aperture;
wherein the control aperture is located at the periphery of the array of source apertures, and
wherein an end adjacent the object of each source aperture other than the source aperture adjacent the control aperture lie in a first common plane, and wherein an end adjacent the object of each of the control aperture and the source aperture adjacent the control aperture is displaced relative to the first common plane.

30. The source array of claim 29, wherein the ends of the control aperture and the source aperture adjacent the control aperture lie in a second common plane parallel to the first common plane.

31. A source array for illuminating an object, the source array comprising:
a mask positioned to receive a measurement beam, the mask having an array of source apertures and a control aperture adjacent one of the source apertures, wherein the control aperture has transverse dimensions larger than the transverse dimensions of the adjacent source aperture, and wherein each of the source apertures and the control aperture is configured to radiate a portion of the measurement beam to the object, the object interacting the radiated measurement beam portion from the control aperture to direct control signal radiation back through the source aperture adjacent the control aperture, wherein the mask further comprises an array of source scattering elements, wherein each source scattering element is adjacent a corresponding one of the source apertures and has transverse dimensions comparable to the corresponding source aperture.

32. A method for illuminating an object with multiple sources, the method comprising:

positioning a mask adjacent the object, wherein the mask has an array of source apertures and a control aperture having transverse dimensions greater than the transverse dimensions of each of the source apertures;

directing radiation to the mask to cause each of the source apertures and the control aperture to radiate a portion of the radiation to the object;

producing an optical interference signal derived from radiation directed to the object from the control aperture; and repositioning the mask relative to the object in response to a control signal derived from the optical interference signal.

* * * * *

UNITED STATES PATENT AND TRADEMARK OFFICE
CERTIFICATE OF CORRECTION

PATENT NO. : 6,552,805 B2
DATED : April 22, 2003
INVENTOR(S) : Henry A. Hill

It is certified that error appears in the above-identified patent and that said Letters Patent is hereby corrected as shown below:

Title page,
Item [56], OTHER PUBLICATIONS, "Fischer" reference, replace
"βm" with -- μm --

Column 1,
Line 43, replace "though" with -- through --
Line 45, replace "mized' with -- mixed --
Lines 49 and 59, replace "date" with -- data --

Column 3,
Line 50, replace "including" with -- include --

Column 10,
Line 62, replace "ϕ" with -- φ --

Column 12,
Line 5, delete "(" before -- S --

Column 13,
Line 34, replace "The" with -- the --

Column 14,
Line 46, replace "ϕ" with -- φ --
Line 67, replace "ϕ" with -- φ -- both times Column 15,
Lines 1 and 40, replace "ϕ" with -- φ --
Line 20, delete "(" before "[1" and ")" delete after "]" in equation
Line 22, delete "T" before "[1"
Line 25, delete "(" before "[1" and delete ")" after "]" in equation

UNITED STATES PATENT AND TRADEMARK OFFICE
CERTIFICATE OF CORRECTION

PATENT NO.    : 6,552,805 B2
DATED         : April 22, 2003
INVENTOR(S)   : Henry A. Hill It is certified that error appears in the above-identified patent and that said Letters Patent is hereby corrected as shown below:

<u>Column 16,</u>
Line 4, replace "$2_{nd}$" with -- $2^{nd}$ --
Line 29, replace "Once" with -- One --
Line 47, insert -- to -- between "enough" and "span"
Line 48, "The" should begin a new paragraph Signed and Sealed this Sixth Day of January, 2004

JAMES E. ROGAN
*Director of the United States Patent and Trademark Office*